(12) United States Patent
Motoshima

(10) Patent No.: US 9,494,213 B2
(45) Date of Patent: Nov. 15, 2016

(54) CHAIN

(71) Applicant: TSUBAKIMOTO CHAIN CO., Osaka-shi, Osaka (JP)

(72) Inventor: Yoshiki Motoshima, Osaki (JP)

(73) Assignee: TSUBAKIMOTO CHAIN CO., Osaka-shi, Osaka (JP)

( * ) Notice: Subject to any disclaimer, the term of this patent is extended or adjusted under 35 U.S.C. 154(b) by 272 days.

(21) Appl. No.: 14/267,961

(22) Filed: May 2, 2014

(65) Prior Publication Data

US 2014/0335988 A1   Nov. 13, 2014

(30) Foreign Application Priority Data

May 7, 2013 (JP) .................................. 2013-097834

(51) Int. Cl.
*F16G 13/04* (2006.01)
*F16G 13/08* (2006.01)

(52) U.S. Cl.
CPC ............... *F16G 13/04* (2013.01); *F16G 13/08* (2013.01)

(58) Field of Classification Search
CPC ................................ F16G 13/04; F16G 13/08
USPC .................................................. 474/211–215
See application file for complete search history.

(56) References Cited

U.S. PATENT DOCUMENTS

| 2002/0058561 A1* | 5/2002 | Kanehira | F16G 13/04 474/213 |
| 2004/0097314 A1* | 5/2004 | Kotera | F16H 7/06 474/213 |
| 2007/0275804 A1* | 11/2007 | Morimoto | F16G 13/04 474/213 |
| 2010/0069188 A1* | 3/2010 | Adachi | B62D 55/096 474/213 |
| 2011/0287883 A1* | 11/2011 | Ritz | F16G 13/08 474/213 |
| 2013/0165285 A1* | 6/2013 | Hamaguchi | F16G 13/04 474/215 |
| 2013/0244821 A1* | 9/2013 | Hamaguchi | F16H 7/06 474/148 |
| 2013/0260934 A1* | 10/2013 | Hamaguchi | F16G 13/04 474/215 |
| 2014/0045632 A1* | 2/2014 | Sasaki | F16G 13/08 474/212 |

FOREIGN PATENT DOCUMENTS

JP   8-68445 A   3/1996
JP   11-201238 A   7/1999

* cited by examiner

*Primary Examiner* — William E Dondero
*Assistant Examiner* — Robert T Reese
(74) *Attorney, Agent, or Firm* — Westerman, Hattori, Daniels & Adrian, LLP

(57) ABSTRACT

An object of the present invention is to provide a chain reducing friction caused by sliding between the pin and the inner plate, whereby durability is improved, a frictional loss is reduced, and the reduction in size and cost can be implemented. In a silent chain, a guide row and a non-guide row, which are adjacent to each other in a longitudinal direction, are connected together in a bendable manner using a single pin movably inserted into a second pinhole of an inner plate. A hole peripheral wall surface forming the second pin hole has a plate rolling surface, and an outer peripheral surface of the pin has a pin rolling surface. During chain bending, the plate rolling surface rolls on the pin rolling surface.

4 Claims, 4 Drawing Sheets

CHAIN

BACKGROUND OF THE INVENTION

1. Field of the Invention

The present invention relates to a chain including a first link and a second link located adjacent to each other in a longitudinal direction and coupled together via a pin in a bendable manner, and in particular, to the shape of the pin and the shape of a pin hole into which the pin is inserted.

The chain is, for example, a silent chain, and is used as a transmission chain in an automotive power unit.

2. Description of the Related Art

In a conventional chain of this kind, for example, a silent chain, a pin held in a pair of guide plates of the first link is inserted into a pin hole in a plurality of inner plates of the second link to connect the second link to the first link in a bendable manner (for example, Japanese Patent Application Laid-open No. H11-201238 (Paragraphs 0014 to 0017 and FIG. 1 and FIG. 2) and Japanese Patent Application Laid-open No. H8-68445 (Paragraphs 0010 and 0011 and FIG. 1 to FIG. 4).

In a chain in which, during chain bending when the second link bends relative to the first link, an outer peripheral surface of the pin held in the guide plates and a hole peripheral wall surface of the pin hole in the inner plates slide on the entire contact areas of the outer peripheral surface and the hole outer peripheral surface (for example, see Japanese Patent Application Laid-open No. H11-201238 (Paragraphs 0014 to 0017 and FIG. 1 and FIG. 2). In this case, the sliding makes the outer peripheral surface of the pin and the hole peripheral surface of the inner plate likely to wear progressively. Thus, disadvantageously, the chain becomes less durable, and power for driving the chain is subjected to a heavy frictional loss attributed to the chain.

In another chain, in addition to the pin held in the guide plates, another pin (see, for example, Japanese Patent Application Laid-open No. F18-68445 (Paragraphs 0010 and 0011 and FIG. 1 to FIG. 4); the pin corresponds to a bush in the roller chain) is inserted into the pin hole in the inner plates. In this case, the pin hole is larger, and thus, the inner plates have an increased size to ensure the rigidity of the plates. This leads to an increased chain pitch, making miniaturization of the chain difficult. Moreover, a plurality of pins is needed. This results in an increase in the number of pins and the number of assembly steps and the need to machine the plurality of pins in addition to the pin hole. Thus, chain costs disadvantageously increase.

The present invention solves these problems, and an object of the present invention is to provide a chain in which a hole peripheral wall surface of a pin hole in an inner plate into which a pin is inserted has a plate rolling surface that can roll on a pin rolling surface during chain bending, thus reducing friction caused by sliding between the pin and the inner plate, whereby durability is improved, a frictional loss is reduced, and the reduction in size and cost can be implemented.

Another object of the present invention is to provide a chain having improved applicability to rotary wheels with different winding diameters.

SUMMARY OF THE INVENTION

The present invention solves the above-described problems by providing a chain including: a plurality of first links; a plurality of second links; and a plurality of pins, the first link including a pair of holding plates, the second link including one or more inner plates disposed between the pair of holding plates in a width direction, the first link and the second link adjacent to each other in a longitudinal direction being coupled together in a bendable manner via the single pin movably inserted into a pin hole in the inner plate and held in a state where rotational movement of the pin is regulated by the pair of holding plates, the chain being wound around one or more rotary wheels, wherein a hole peripheral wall surface of the inner plate forming the pin hole has a plate rolling surface, an outer peripheral surface of the pin has a pin rolling surface, and the plate rolling surface rolls on the pin rolling surface during chain bending in which the second link bends relative to the first link.

According to the chain of the present invention set forth in claim 1, the hole peripheral wall surface of the inner plate forming the pin hole has the plate rolling surface, the outer peripheral surface of the pin has the pin rolling surface, and the plate rolling surface rolls on the pin rolling surface during chain bending when the second link bends relative to the first link. Thus, during chain bending, the plate rolling surface rolls on the pin rolling surface, and thus, this embodiment reduces possible friction between the outer peripheral surface and the hole peripheral wall surface compared to a case where the entire contact areas of the outer peripheral surface and the hole peripheral wall surface are slidable. This enables a reduction in wear of the outer peripheral surface and the hole peripheral wall surface, allowing the durability of the chain to be improved. Furthermore, a frictional loss attributed to the chain can be reduced.

Furthermore, since the only one pin is inserted into the pin hole, the size of the pin hole can be reduced. This enables a reduction in chain pitch to allow the chain to be miniaturized. The number of pins and the number of assembly steps are reduced, thus enabling a reduction in chain costs.

Moreover, the rolling surface (hereinafter referred to as the "opposite rolling surface") that rolls on the pin rolling surface is a plate rolling surface formed on the inner plate, which is a member larger than the pin. Thus, compared to a case where the opposite rolling surface is formed on the pin, this embodiment enables an increase in the degree of freedom for the design of the shape of the opposite rolling surface. Moreover, the opposite rolling surface is formed by machining the pin hole. This enables a reduction in chain costs.

According to the chain of the present invention set forth in claim 2, the plate rolling surface and the pin rolling surface are protruding curved surfaces. Thus, the rolling surfaces, compared to a recessed curved surface, exhibit an increased ratio of an angle of bending the inner plate with respect to a rolling distance. Consequently, a wide range of chain bending angles can be achieved, while facilitating miniaturization of the chain based on a reduction in the sizes of the pin and the pin hole. This allows improvement of the applicability of the chain to rotary wheels with different winding diameters.

According to the chain of the present invention set forth in claim 3, the rolling surface length of the plate rolling surface is larger than the rolling surface length of the pin rolling surface. Thus, with the rolling of the pin permitted by making use of the formation of the opposite rolling surface, which rolls on the pin rolling surface, on the inner plate, which is larger than the pin, clearance in the pin hole can be more easily ensured. Furthermore, the chain can be bent using the entire rolling surface length of the pin rolling surface. This allows improvement of the applicability of the chain to rotary wheels with different winding diameters.

According to the chain of the present invention set forth in claim 4, the outer peripheral surface has a pin rear surface positioned opposite the pin rolling surface in the longitudinal direction and a pin connection surface that connects the pin rear surface and the pin rolling surface together on an opposite bending side. The pin connection surface is smaller than the pin rolling surface in radius of curvature. Thus, in the outer peripheral surface, the pin connection surface, which is continuous with the pin rolling surface, has a small radius of curvature. Consequently, possible interference between the outer peripheral surface and the hole peripheral wall surface during chain bending can be more easily avoided, while allowing the rolling surface length of the pin rolling surface to be set larger. This allows improvement of the applicability of the chain to rotary wheels with different winding radii.

The chain of the present invention set forth in claim 5 is a silent chain disposed in a lubricant atmosphere wherein the holding plate is a guide plate, and the first link has one or more middle plates disposed adjacent to the inner plate between a pair of the guide plates in the width direction. Furthermore, the pin is inserted through the pin hole in the middle plate with a space formed between the pin hole and the pin rolling surface, and the space is positioned so as to overlap the plate rolling surface as viewed in the width direction. Thus, upon infiltrating to between the inner plate and the middle plate in the width direction and then reaching the space, a lubricant can be fed to the pin rolling surface and the plate rolling surface, that is, the contact areas of both rolling surfaces. Therefore, the lubricant fed from the space reduces the wear of both rolling surfaces, making the silent chain more durable.

In connection with the present invention, the width direction is a chain width direction, and the longitudinal direction is a chain longitudinal direction. The width direction is a direction parallel to rotational center lines of rotary wheels or the axial direction of the pin. The longitudinal direction is a direction in which the chain extends along a plane orthogonal to the width direction.

Furthermore, a side toward which the chain is bent when the chain meshes with the rotary wheels is hereinafter referred to as a bending side. A side opposite to the bending side is hereinafter referred to as an opposite bending side.

BRIEF DESCRIPTION OF THE DRAWINGS

FIG. 4 is a diagram illustrating a state in which the silent chain in FIG. 1 is wound and bent around a rotating sprocket, wherein FIG. 4A, FIG. 4D, and FIG. 4G are side views of an important part, FIG. 4B and FIG. 4C are enlarged views of a part (b) and a part (c) of FIG. 4A, FIG. 4E and FIG. 4F are enlarged views of a part (e) and a part (f) of FIG. 4D, and FIG. 4H and FIG. 4I are enlarged views of a part (h) and a part (i) of FIG. 4G.

DESCRIPTION OF THE PREFERRED EMBODIMENTS

A chain according to the present invention may be a silent chain, or instead of the silent chain, a link chain (including a roller chain) including a plurality of first links each including a pair of first link plates and a plurality of second links each including a pair of second link plates.

The chain according to the present invention may be, instead of a transmission chain, a conveyance chain or an actuator chain. Thus, a chain apparatus including the chain may be a chain transmission apparatus, a chain conveyance apparatus, or any other apparatus. At least one rotary wheel around which the chain is wound may be used.

The chain transmission apparatus including the chain according to the present invention may be used in an automotive power unit serving as a machine, for a power transmission apparatus or an engine providing the power unit, or may be used in a power unit other than the power units for automobiles or a machine other than the power units. For example, the chain may be provided in a continuously variable transmission for automobiles or a continuously variable transmission other than the continuously variable transmissions for automobiles. In this case, the rotary wheels are variable pulleys with a changeable wining radii.

Embodiment

An embodiment of the present invention will be described below with reference to FIG. 1 to FIG. 4.

Figure 1:
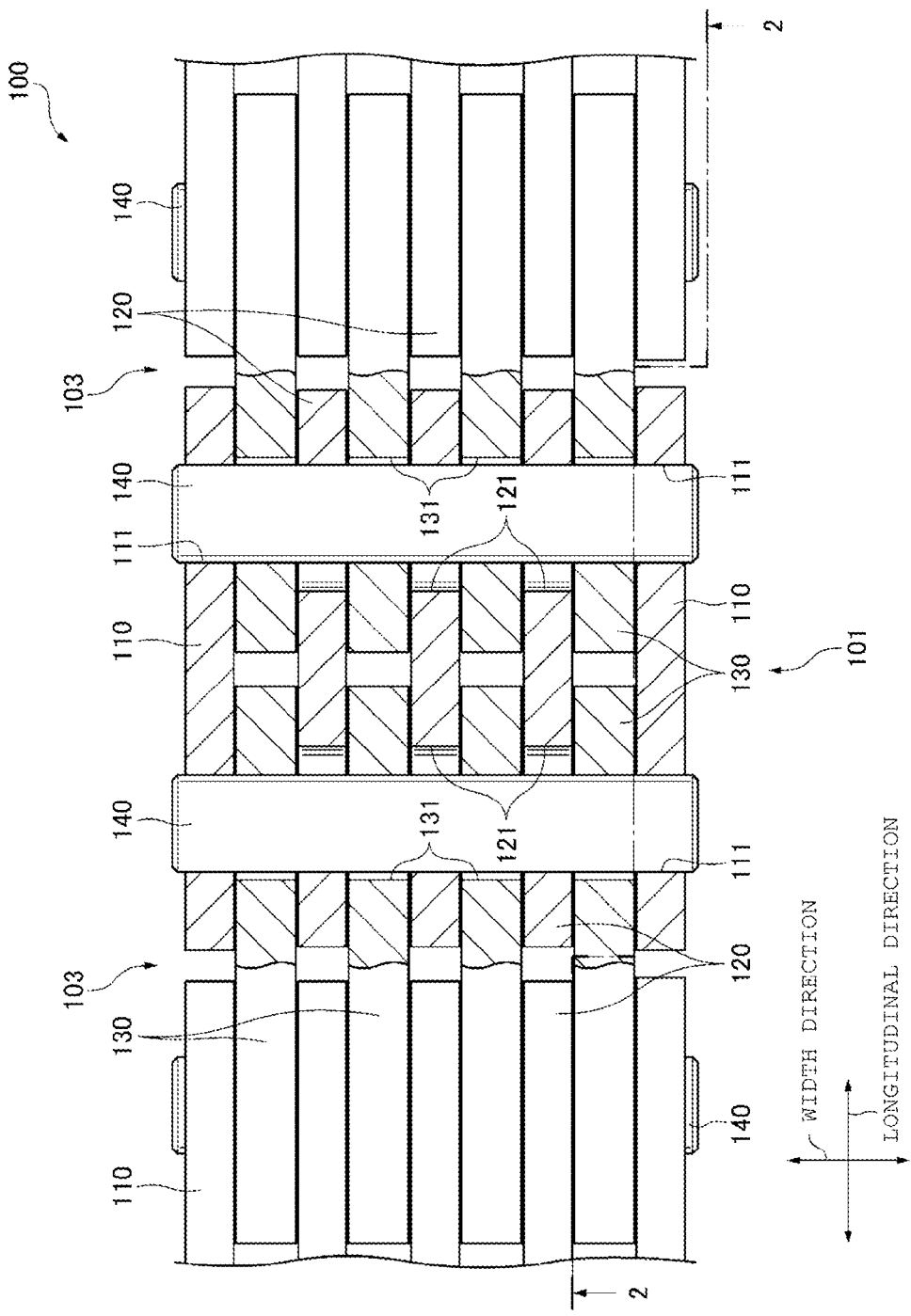
FIG. 1 is a plan view showing an important part of a silent chain according to an embodiment of the present invention, a part of the plan view being a cross-sectional view taken along a pitch plane.
Figure 2:
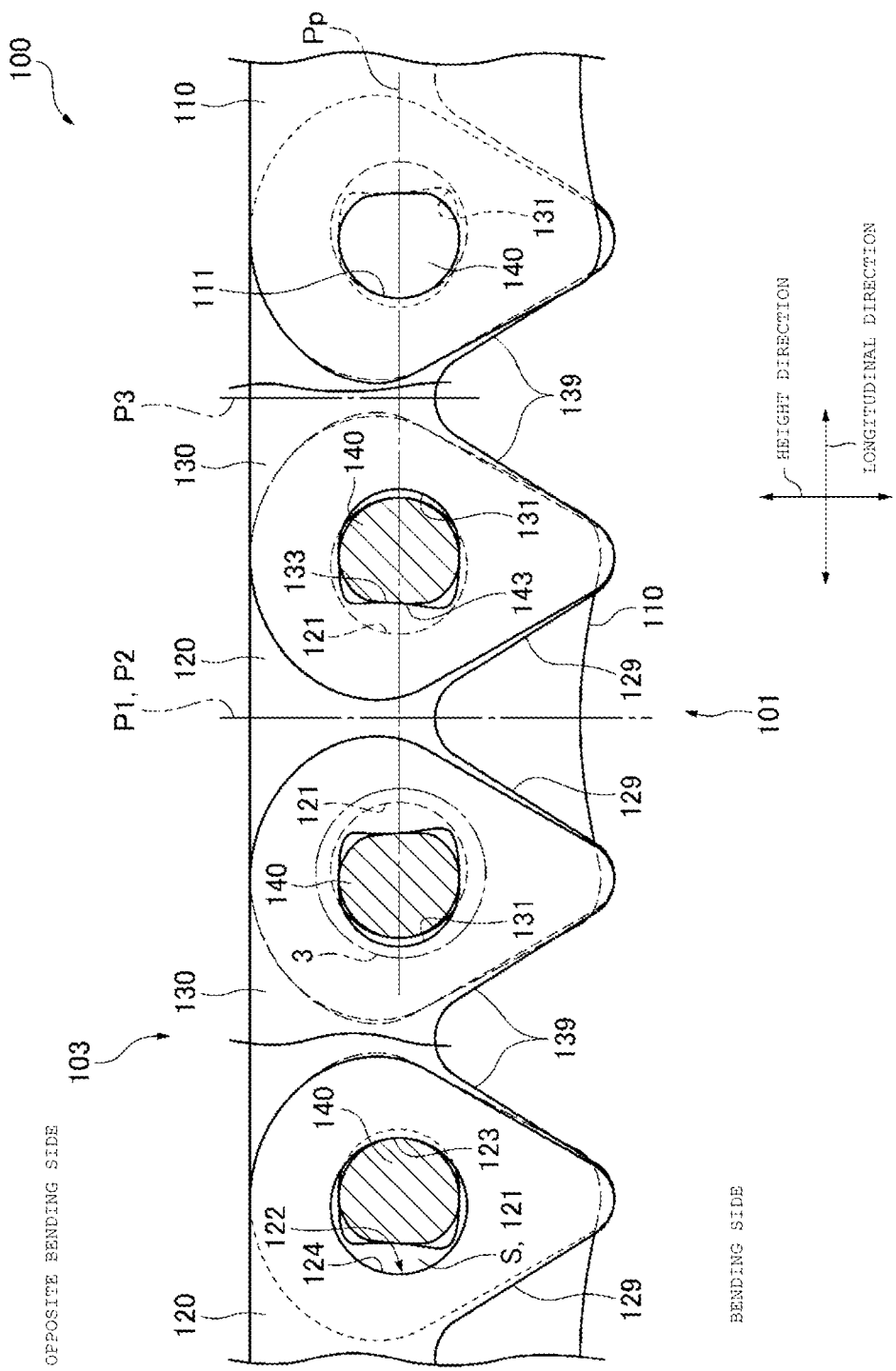
FIG. 2 is a cross-sectional view taken along line 2-2 in FIG. 1.

As shown in FIG. 1 and FIG. 2, a silent chain (hereinafter referred to as a "chain") 100 serving as a chain is an endless transmission chain provided in a chain transmission apparatus, according to the embodiment of the present invention.

Besides the chain 100, the chain transmission apparatus includes a sprocket mechanism serving as a winding mechanism and including sprockets 10 (FIG. 4) serving as a plurality of rotary wheels around which the chain 100 is passed. The chain transmission apparatus is provided in a power transmission apparatus for an automotive power unit.

The chain transmission apparatus is disposed in a chain chamber in the power unit. The chain 100 and the sprockets 10 are lubricated in a lubricant. Thus, a lubricating environment or a lubricant atmosphere based on a lubricant is present in the chain chamber.

The chain 100 includes guide rows 101 serving as a plurality of first links, non-guide rows 103 serving as a plurality of second links, and a plurality of pins 140. The guide row 101 and the non-guide row 103, which are adjacent to each other in a longitudinal direction, are coupled together via the single pin 140 in a bendable manner. Each of all the guide rows 101 and each of all the non-guide rows 103 are alternately connected together in the longitudinal direction.

Each of the guide rows 101 has a guide plates 110 serving as a pair of holding plates and one or more, in this case, a plurality of middle plates 120 disposed between the pair of guide plates 110 in the width direction.

Figure 4:
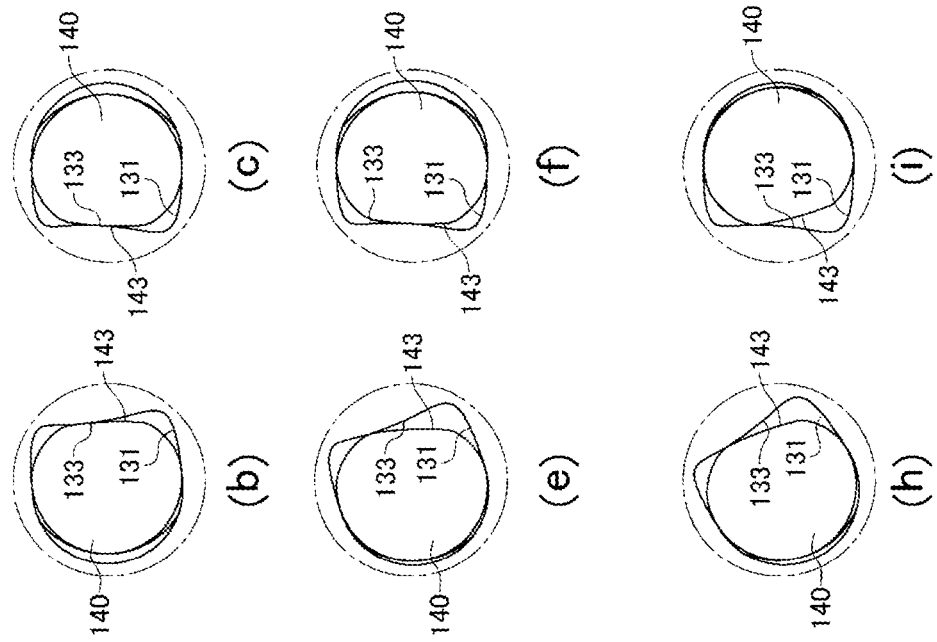
Figure 4:
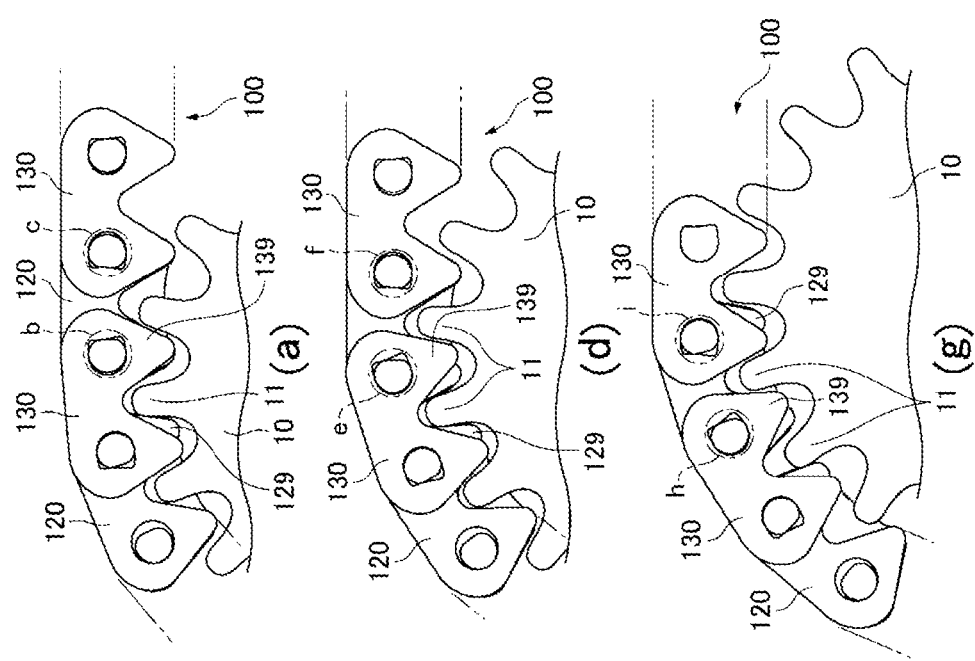

Each of the guide plates 110 includes holding holes 111 spaced from each other in the longitudinal direction and serving as a pair of pin holding portions. Each of the middle plates 120 includes a pair of first pin holes 121 and spaced from each other in the longitudinal direction and a pair of tooth portions 129 that is meshing portions capable of meshing with respective plurality of sprocket teeth 11 of the sprocket 10 (FIG. 4).

Each of the non-guide rows 103 has one or more, in this case, a plurality of inner plates 130 disposed in the width direction. The inner plate 130 includes a pair of second pin holes 131 spaced from each other in the longitudinal direction and a pair of tooth portions 139 that is meshing portions capable of meshing with the respective sprocket teeth 11 of the sprocket teeth 11.

The number of inner plates 130 in each of the non-guide rows 103 is larger than the number of middle plates 120 in each of the guide rows 101 by one. In the non-guide row 103, all the inner plates 130 are arranged between the pair of guide plates 110 in the width direction and each lie adjacent to the middle plate 120 in the width direction. Every one or more of all the middle plates 120, in an illustrated example, each of all the middle plates 120, and every one or more of all the inner plates 130, in the illustrated example, each of all the inner plates 130, are alternately arranged in the width direction in a laminated manner.

The holding holes 111, the first pin holes 121, and the second pin holes 131 are shaped surface-symmetrically with respect to central surfaces P1, P2, and P3, respectively, which cross the guide plate 110, the middle plate 120, and the inner plate 130, respectively, in the longitudinal direction. The central surfaces P1 to P3 divide the longitudinal spacing between the pair of the holding holes 111, the longitudinal spacing between the pair of first pin holes 121, and the longitudinal spacing between the pair of second pin holes 131, respectively, into two halves for each of the guide, middle, and inner plates 110, 120, and 130.

For each of the plates 110, 120, and 130, a side toward which the chain 100 bends upon meshing with the sprocket 10 (FIG. 4) with respect to a pitch plane Pp (FIG. 2) is hereinafter referred to as a bending side, and a side opposite to the bending side is hereinafter referred to as an opposite bending side, for convenience of description. The holding holes 111 and the pin holes 121 and 131 are shaped surface-symmetrically with respect to the pitch plane Pp.

The pitch plane Pp is a plane passing through an area where rolling surfaces 133 and 134, which are described later, are in contact with each other, for the guide rows 101 connected together in alignment and included in a linear portion of the chain 100 that is a portion in a linear state and for the non-guide rows 103 connected together in alignment and also included in the linear portion.

Furthermore, in any area in each of the plates 110, 120, and 130, a side relatively closer to the central surface P1, P2, or P3 is hereinafter referred to as a central surface side. A side relatively further from the central surface P1, P2, or P3 is hereinafter referred to as an opposite central surface side.

The pins 140 are inserted into the holding holes 111, the first pin holes 121, and the second pin holes 131 arranged in the width direction in the guide rows 101 and the non-guide rows 103 arranged adjacently to one another in the longitudinal direction. In this state, each of the pins 140 is locked using locking means (for example, press fit or crimping) and is held in the holding holes 111 using coupling means (for example, press fit or engagement with the guide plates 110) in such a manner that rotational movement of the pin 140 is regulated, for example, disabled. Thus, the pin 140 is interposed in the holding holes 111 in a fixed state in which rotational movement of the pin 140 is regulated, in this case, disabled.

On the other hand, the pin 140 is loosely fitted in the first and second pin holes 121 and 131 so as to be able to roll in the first and second pin holes 121 and 131 and is movably interposed in the first and second pin holes 121 and 131.

All the pins 140 in the chain 100 have the same shape. Furthermore, the pins 140 have the same cross-sectional shape at any position in the width direction.

The cross-sectional shape is a shape obtained when a cutting plane is a plane orthogonal to the width direction.

Figure 3:
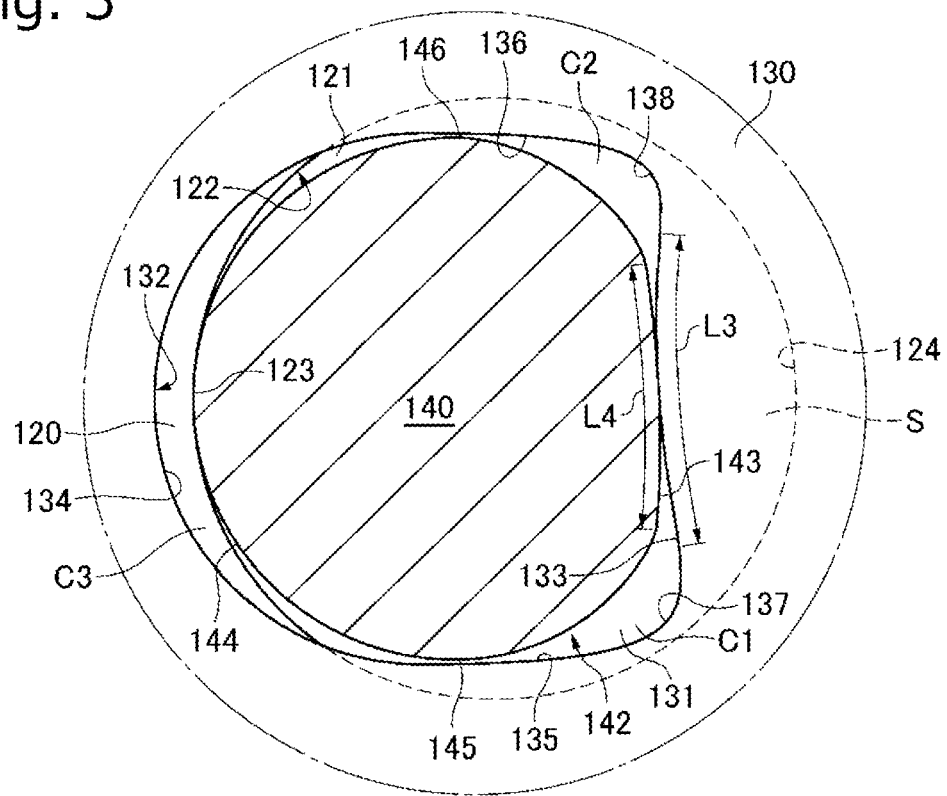
FIG. 3 is an enlarged view of a part 3 of FIG. 2.

As shown in FIG. 2 and FIG. 3, the pin 140 is press-fitted in the holding holes 111 in the guide plates 110.

A hole peripheral wall surface 122 forming the first pin hole 121 in the middle plate 120 is divided into a contact surface 123 that can be contacted by an outer peripheral surface 142 of the pin 140 and a noncontact surface 124 that constantly forms a space S between the noncontact surface 124 and the outer peripheral surface 142. The first pin hole 121 is a circular hole with a circular cross section shaped like a single circle with one radius of curvature.

The space S formed by inserting the pin 140 through the first pin hole 121 is positioned so as to overlap the entire plate rolling surface 133 in the second pin hole 131 as viewed in the width direction, and in a bent state, positioned so as to constantly overlap the contact areas of both rolling surfaces 133 and 143.

The circular shape or the circular arc shape means a single circle or circular arc with one radius of curvature or a composite circular arc including a plurality of circles or circular arcs with different radii of curvature.

In the inner plate 130, a hole peripheral wall surface 132 forming the second pin hole 131 is divided into the plate rolling surface 133 and a plate non-rolling surface. In the hole peripheral wall surface 132, the plate rolling surface 133 is positioned opposite the central surface.

The plate non-rolling surface has a longitudinally opposite surface 134 opposite to a pin rear surface 144 described below in the longitudinal direction, a pair of height opposite surfaces 135 and 136 which is continuous with the longitudinally opposite surface 134 on the bending side and on the opposite bending side and which is opposite to pin connection surfaces 145 and 146 described below in a height direction, and a pair of plate connection surfaces 137 and 138 that connects the plate rolling surface 133 to the pair of height opposite surfaces 135 and 136, respectively, on the bending side and on the non-bending side.

A gap (FIG. 3) is formed between the height opposite surface 135 and the pin connection surface 145 and between the height opposite surface 136 and the pin connection surface 146 to enable relative bending of the guide row 101 and the non-guide row 103 based on relative rolling between the inner plate 130 and the pin 140. The gap is omitted from FIG. 2 and FIG. 4 for convenience of drawing.

The height direction is a chain height direction and is orthogonal to the width direction and the longitudinal direction and to the pitch plane Pp.

The plate rolling surface 133 is a protruding curved surface. The longitudinally opposite surface 134, the height opposite surfaces 135 and 136, and the plate connection surfaces 137 and 138 are recessed curved surfaces. The plate rolling surface 133, the longitudinally opposite surface 134, the height opposite surfaces 135 and 136, and the plate connection surfaces 137 and 138 each have a cross section shaped like a circular arc, in this case, a single circular arc. Thus, the plate non-rolling surface has a cross section shaped like a composite circular arc.

The radius of curvature decreases in the following order: the height opposite surfaces 135 and 136, the plate rolling surface 133, the hole peripheral wall surface 122 of the first pin hole 121, the longitudinally opposite surface 134, and the plate connection surfaces 137 and 138.

The outer peripheral surface 142 of the pin 140 is divided into the pin rolling surface 143 and a pin non-rolling surface.

The pin rolling surface 143 constantly forms a space S between the pin rolling surface 143 and the noncontact surface 124 of the first pin hole 121.

The pin non-rolling surface has the pin rear surface 144 that is constantly out of contact with the longitudinally opposite surface 134 and the height opposite surfaces 135 and 136, and the pair of pin connection surfaces 145 and 146 that connects the pin rear surface 144 and the pin rolling surface 143 together on the bending side and on the non-bending side. The pin rear surface 144 is positioned opposite the pin rolling surface 143 in the longitudinal direction.

The pin rolling surface 143, the pin rear surface 144, and the pin connection surfaces 145 and 146 are protruding curved surfaces. The pin rolling surface 143 and the pin non-rolling surface has a cross section shaped like a circular arc, in this case, a single circular arc. Thus, the pin rear surface 144 and the pair of pin connection surfaces 145 and 146 have the same radius of curvature.

The radius of curvature decreases in the following order: the pin rolling surface 143, the hole peripheral wall surface 122 of the first pin hole 121, and the pin non-rolling surface. The radius of curvature of the pin rear surface 144 is equal to or larger than the radius of curvature of each of the pin connection surfaces 145 and 146. In the illustrated example, the radius of curvature of the pin rear surface 144 is equal to the radius of curvature of each of the pin connection surfaces 145 and 146, as described above. Thus, the radius of curvature of each of the pin connection surfaces 145 and 146 is smaller than the radius of curvature of the pin rolling surface 143.

Furthermore, the radii of curvature of the plate rolling surface 133 and the pin rolling surface 143 are the same in the illustrated example but may be different from each other. The radius of curvature of the longitudinally opposite surface 134 is larger than the radius of curvature of the pin rear surface 144.

Clearances C1, C2, and C3 are formed in the second pin hole 131 in order to permit the plate rolling surface 133 to roll on the pin rolling surface 143. The clearance C1 is formed between the plate connection surface 137 and the pin connection surface 145 on the bending side, the clearance C2 is formed between the plate connection surface 138 and the pin connection surface 146 on the opposite bending side, and the clearance C3 is formed between the longitudinally opposite surface 134 and the pin rear surface 144.

The rolling surface length L3 of the plate rolling surface 133 is larger than the rolling surface length L4 of the pin rolling surface 143. The rolling surface lengths L3 and L4 are the lengths of the plate rolling surface 133 and the pin rolling surface 143 in section.

The plate rolling surface 133 and the pin rolling surface 143 are in contact with each other so as to be able to roll. During chain bending when the non-guide row 103 (that is, the inner plates 130) bends relative to the guide row 101 (that is, the guide plates 110 and the middle plates 120), the plate rolling surface 133 rolls on and relative to the pin rolling surface 143.

With reference to FIG. 2 to FIG. 4, a chain bending state will be described in which the chain 100 is wound around the sprocket 10.

When the inner plates 130 of the chain (FIG. 2) in the linear state start to bend (FIG. 4A), between the plate rolling surface 133 and the pin rolling surface 143, the plate rolling surface 133 (that is, the inner plate 130) rolls relative to the pin rolling surface 143 (that is, the pin 140 and further the guide plate 110 and the middle plate 120) while involving substantially no sliding.

The relative movement of the inner plate 130 and the pin 140 in the height direction by an amount larger than a predetermined movement amount as a result of the abutting contact between the tooth portions 129 and 139 and the sprocket teeth 11 is regulated by the contact between the height opposite surface 135 and the pin connection surface 145, located opposite each other, and between the height opposite surface 136 and the pin connection surface 146, located opposite each other.

Then, as the bending of the chain 100 progresses sequentially as shown in FIG. 4D and FIG. 4G, the plate rolling surface 133 further rolls on the pin rolling surface 143. Thus, the inner plates 130, which have started bending from the linear state, reach the maximum bending state to complete the bending.

From the start of the bending of the inner plates 130 until the completion of the bending or during chain bending, the plate rolling surface 133 and the pin rolling surface 143 roll relative to each other in a contact state while involving substantially no sliding. Thus, the outer peripheral surface 142 of the pin 140 and the hole peripheral wall surface 132 of the inner plate 130 are in rolling contact with each other, reducing the friction between the outer peripheral surface 142 and the hole peripheral wall surface 132.

Furthermore, from the start till the completion of bending, the gaps between the height opposite surface 135 and the pin connection surface 145 and between the height opposite surface 136 and the pin connection surface 146 in the height direction are formed by setting the shapes of the pin connection surfaces 145 and 146 and the height opposite surfaces 135 and 135 so as to reduce the range of movement, in the height direction, of the inner plate 130 and the pin 140, which roll relative to each other. This suppresses the sliding between the outer peripheral surface 142 of the pin 140 and the hole peripheral wall surface 132 of the inner plate 130, reducing the friction between the pin 140 and the inner plate 130.

An embodiment obtained by modifying a part of the configuration of the above-described embodiment will be described in conjunction with description of the modified part.

The plate rolling surface 133 may be positioned on the central surface side of the hole peripheral wall surface 132 or may be a recessed curved surface.

The chain may be a roller chain in which the first link has a pair of outer plates serving as a pair of holding plates, whereas the second link has a pair of inner plates and in which the pin has a circular cross-sectional shape between the inner plates and supports a roller so that the roller is rotatable.

What is claimed is:
1. A chain comprising: a plurality of first links; a plurality of second links; and a plurality of pins, the first link including a pair of holding plates, the second link including one or more inner plates disposed between the pair of holding plates in a width direction, the first link and the second link adjacent to each other in a longitudinal direction being coupled together in a bendable manner via the single pin movably inserted into a pin hole in the inner plate and held in a state where rotational movement of the pin is regulated by the pair of holding plates, the chain being wound around one or more rotary wheels, wherein
    a hole peripheral wall surface of the inner plate forming the pin hole has a plate rolling surface which is a protruding curved surface toward a center of the pin hole,
    an outer peripheral surface of the pin has a pin rolling surface which is a protruding curved surface, and
    the plate rolling surface rolls on the pin rolling surface during chain bending in which the second link bends relative to the first link.

2. The chain according to claim 1, wherein the rolling surface length of the plate rolling surface is larger than the rolling surface length of the pin rolling surface.

3. The chain according to claim 1, wherein the outer peripheral surface comprises a pin rear surface positioned opposite the pin rolling surface in the longitudinal direction and a pin connection surface that connects the pin rear surface and the pin rolling surface together on an opposite bending side, and
- the radius of curvature of the pin connection surface is smaller than the radius of curvature of the pin rolling surface.

4. The chain according to claim 1, which is a silent chain disposed in a lubricant atmosphere, wherein
- the holding plate is a guide plate,
- the first link has one or more middle plates disposed adjacent to the inner plates in the width direction between a pair of the guide plates,
- the pin is inserted through the pin hole in the middle plate with a space formed between the pin and the pin rolling surface, and
- the space is positioned so as to overlap the plate rolling surface as viewed in a width direction.

* * * * *